(12) United States Patent
Borja

(10) Patent No.: US 7,192,519 B1
(45) Date of Patent: Mar. 20, 2007

(54) DEVICES AND METHODS FOR LOCALIZED HEATING

(75) Inventor: Luis Hector Palacios Borja, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/344,562

(22) Filed: Jan. 30, 2006

(51) Int. Cl.
*H05B 1/00* (2006.01)
(52) U.S. Cl. .................. 210/200; 219/227; 219/229
(58) Field of Classification Search .......... 219/200, 219/227, 229
See application file for complete search history.

(56) References Cited

U.S. PATENT DOCUMENTS 3,578,948 A * 5/1971 Friend et al. ............. 219/230
4,208,571 A * 6/1980 Moumaneix et al. ...... 219/227
4,602,144 A * 7/1986 Vogel ...................... 219/230
6,821,381 B1 11/2004 Yamauchi et al. ....... 156/583.1

FOREIGN PATENT DOCUMENTS

GB 2265212 A 9/1993
JP 11034168 A 2/1999

OTHER PUBLICATIONS

Opdahl, Peter J., "Anisotropic Conductive Film for Flipchip Applications: An Introduction" http://www.flipchips.com/tutorial05.html Dec. 15, 2005.

\* cited by examiner

*Primary Examiner*—Robin Evans
*Assistant Examiner*—Vinod Patel
(74) *Attorney, Agent, or Firm*—Zilka-Kotab, PC

(57) ABSTRACT

A device for heating a workpiece located in a primary direction of heating relative to the device, the device comprising a heating element, and a thermal shield adjacent the heating element for inhibiting heat conduction and radiation from the heating element to the workpiece in directions other than the primary direction of heating. In one embodiment, the heating element does not extend beyond the thermal shield in the primary direction of heating.

15 Claims, 5 Drawing Sheets

DEVICES AND METHODS FOR LOCALIZED HEATING

FIELD OF THE INVENTION

The present invention relates to heating devices, and more particularly, this invention relates to heating devices having a thermal shield for inhibiting incident heating, and methods of use of such devices.

BACKGROUND OF THE INVENTION

Heating is used in many types of electronics processing, among them, conductive bonding using Anisotripic Conductive Film (ACF) or solder. A drawback, however, of heretofore known heating devices is that the heating is not localized. Rather, conduction and radiation heat the areas surrounding the device, potentially causing unwanted results.

For example, hot bar bonding methods for ACF film have been developed over time primarily for LCD screens. Peripheral heating has not been a problem in ACF bonding, because it has been primarily used in flat panel displays, e.g., Liquid Crystal Displays (LCDs). The bonding tips used typically are solid metal pieces that can heat up large areas around the bond. Since the temperatures are usually high (typically 170–200° C.), these bonding tips are impractical for use in applications where the high temperatures may damage components near the bonding area. Accordingly, for new applications of ACF bonding such as adhering chips to boards or cables, application of heat to the entire surface could result in damage to or desoldering of other components of the board or cable.

There is accordingly a clearly-felt need in the art for a heating device that provides localized heat while minimizing conductive and radiant heating of surrounding areas.

SUMMARY OF THE INVENTION

A device for heating a workpiece located in a primary direction of heating relative to the device, the device comprising a heating element, and a thermal shield adjacent the heating element for inhibiting heat conduction and radiation from the heating element to the workpiece in directions other than the primary direction of heating. In one embodiment, the heating element does not extend beyond the thermal shield in the primary direction of heating.

A method for heating a workpiece includes energizing a heating device, positioning the device towards the workpiece, holding the device at the position towards the workpiece for a period of time for heating the workpiece, and removing the device from the position towards the workpiece.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

Figure 1:
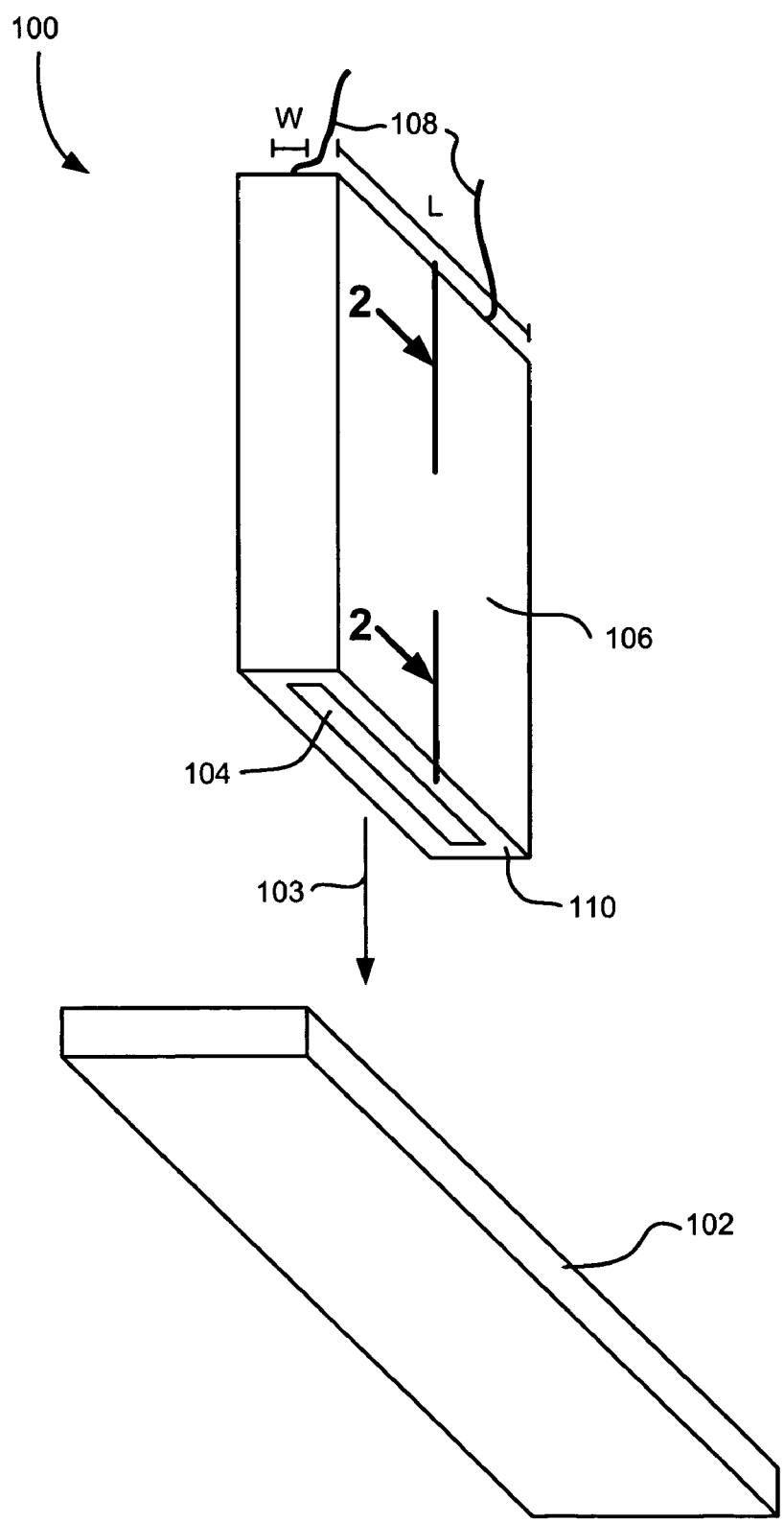
FIG. 1 illustrates a device for heating a workpiece according to one embodiment.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

The devices presented herein allow a user or machine to heat a local area with minimal heat transfer to areas of the workpiece not immediately adjacent the heating element. Note that the workpiece refers to the structure being heated.

The devices described herein can be used for any kind of localized heating. Examples of uses of the device include but not limited to ACF bonding, soldering, spot curing, heat-induced delamination, desoldering, etc.

FIG. 1 illustrates a device 100 for heating a workpiece 102 located in a primary direction of heating 103 relative to the device 100. The device 100 comprises a heating element 104 and a thermal shield 106 adjacent the heating element 104. Note that the section of the thermal shield 106 that would cover the structure on the plane facing out of the paper has been removed for display purposes, and may be similarly absent in some embodiments. The thermal shield 106 inhibits heat conduction and radiation from the heating element 104 to the workpiece in directions other than the primary direction of heating. In the embodiment shown, the heating element 104 does not extend beyond the thermal shield 106 in the primary direction of heating, but rather is coextensive therewith, as shown in FIG. 2, which is a cross sectional view of the device 100 of FIG. 1.

Figure 2:
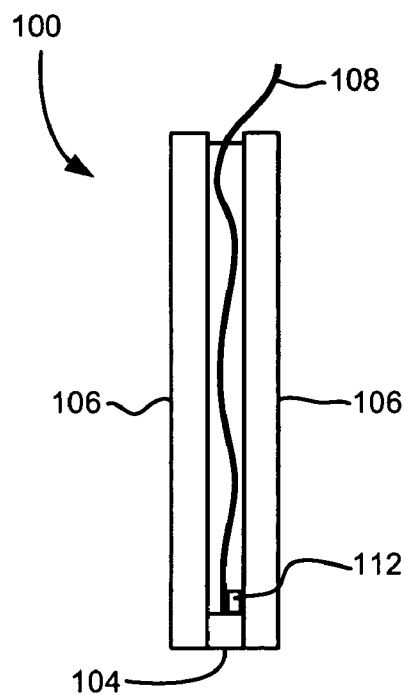
FIG. 2 is a partial cross sectional view taken from Line 2—2 of FIG. 1.

With continued reference to FIGS. 1 and 2, the heating element 104 may be any suitable heating element 104. In one embodiment, the heating element 104 includes a layer with a high heat capacity and high thermal conductivity, e.g., a metal such as iron, aluminum, etc., or a thermally conductive ceramic. The heating element 104 may also include a heat source such as an electrical filament, e.g., of tungsten, that generates heat when electricity passes therethrough. Electrical leads 108, e.g., wires, are coupled to the filament to carry electricity thereto. The heating surface of the heating element 104 may take many shapes, including square, rectangular, round, etc. heating surface. Likewise, the heating element 104 may have a square, rectangular, round, polygonal, etc. cross section.

Figure 3:
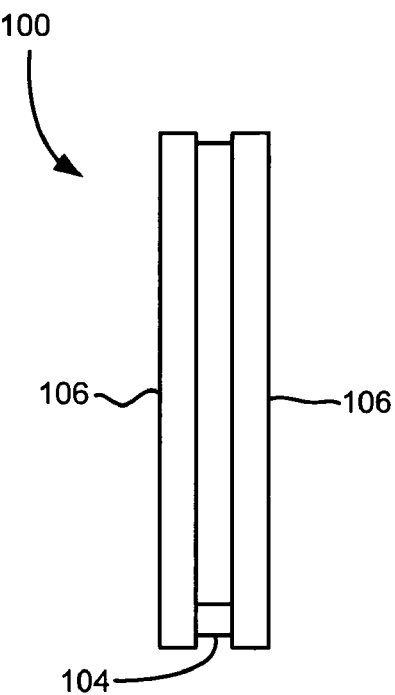
FIG. 3 illustrates a device for heating a workpiece according to another embodiment.
Figure 4:
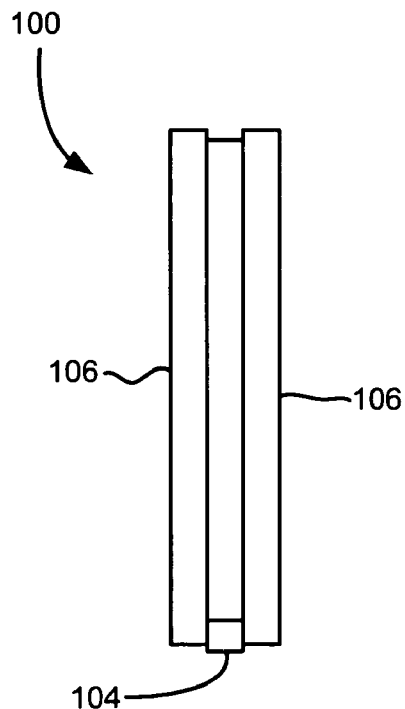
FIG. 4 illustrates a device for heating a workpiece according to yet another embodiment.

The position of the heating element 104 relative to the end 110 of the thermal shield 106 may be coplanar with the end 110 of the thermal shield 106 as shown in FIG. 1, recessed therefrom as shown in FIG. 3, or slightly protruding beyond the thermal shield 106 as shown in FIG. 4.

With reference to FIG. 2, a temperature sensing device 112, e.g., thermocouple, may be present in close proximity to the heating element 104 to assist in achieving the desired temperature as well as maintaining a constant temperature.

In a variation of the embodiment shown in FIG. 3 the heating element 104 is a radiant heating element 104 recessed from the plane defined by the bottoms of the thermal shield 106.

The thermal shield 106 is preferably constructed of a material having a low thermal conductivity to contain heat transfer from the heating element 104. The thermal shield 106 is also preferably opaque to reduce or eliminate radiation. Illustrative materials may include ceramics, darkened glass, etc. The thermal shield 106 may entirely encircle the heating element 104, or only a portion thereof. Multiple thermal shields 106 may also be present, e.g., one on each side of the heating element 104. The actual configuration will depend on the intended use of the device 100.

Figure 5:
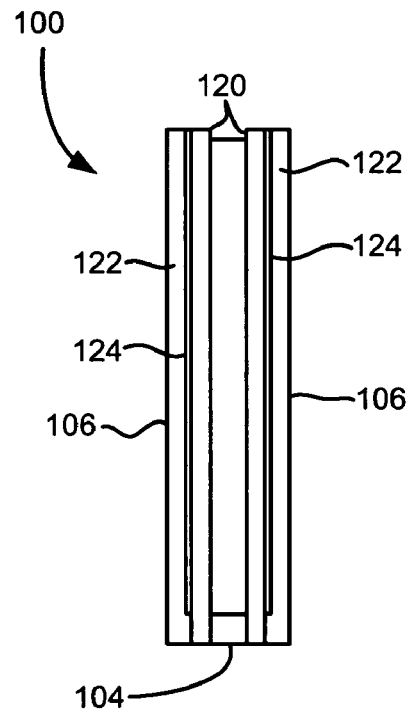
FIG. 5 illustrates a device for heating a workpiece according to a further embodiment.

The thermal shield 106 may also be constructed of laminates or two or more layers. Various configurations are anticipated, including but not limited to laminates of materials of varying thermal conductivity. One illustrative laminate structure is shown in FIG. 5, and includes inner and outer layers 120, 122 of lower thermal conductivity material, e.g., ceramic, sandwiching a layer 124 of higher thermal conductivity material, e.g., metal. The layer 124 of higher thermal conductivity material acts as a heat sink to carry heat away from the inner layer of lower thermal conductivity material. This in turn keeps the overall temperature of the thermal shield 106 lower, which may be important where the thermal shield 106 may not have time to cool between heating cycles. So that the layer of higher thermal conductivity material does not transfer significant heat to the workpiece, the layer of higher thermal conductivity material may be recessed from the plane defined by the bottom of the thermal shield 106 as shown in FIG. 5, or may be thin so as to slowly transfer heat from the inner layer. Either way, the overall thickness of the thermal shield 106 may be reduced due to the benefits provided by the heat sink.

Figure 6:
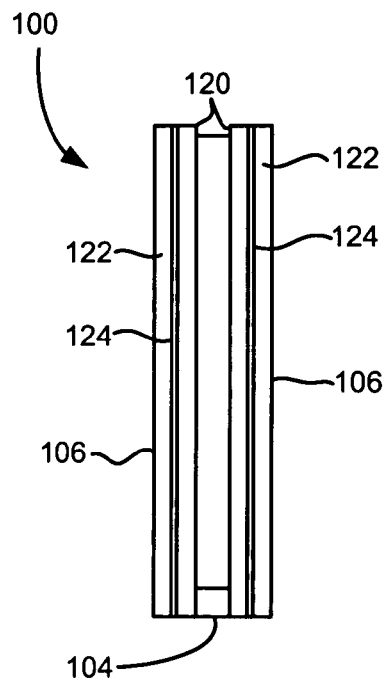
FIG. 6 illustrates a device for heating a workpiece according to another embodiment.
Figure 7:
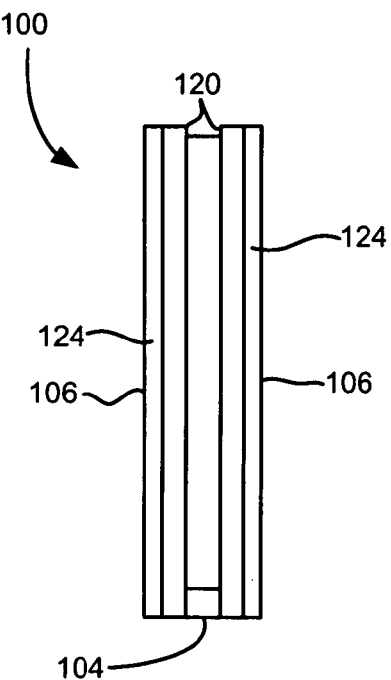
FIG. 7 illustrates a device for heating a workpiece according to yet another embodiment.

In a further embodiment, shown in FIG. 6, the layer 124 of higher thermal conductivity material may be exposed to the workpiece, thereby acting as a heat sink to carry heat away from the workpiece. Such a layer 124 of higher thermal conductivity material may be sandwiched between layers of lower thermal conductivity material 120, 122 as shown in FIG. 6, may form the outside of the thermal shield 106 relative to the heating element 104 as shown in FIG. 7, etc.

In any of the above embodiments, the layer of higher thermal conductivity material acting as a heat sink preferably includes a mechanism for transferring heat therefrom to another medium, such as air, another heat sink (which may be integral to the layer), etc. For instance, where the layer of higher thermal conductivity material is air cooled, it may be attached to or include fins to accelerate convective heat transfer to the air, as discussed in reference to FIG. 8, below.

Figure 8:
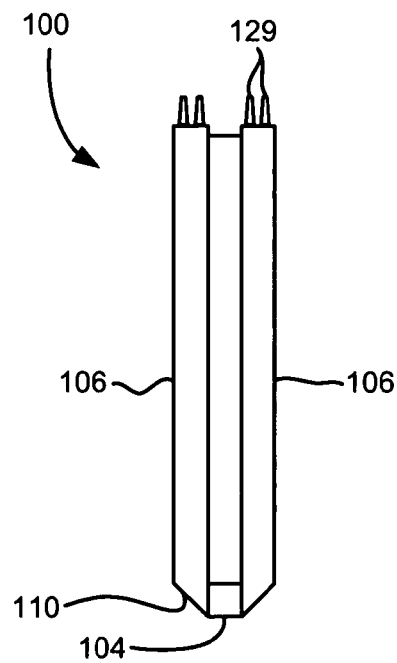
FIG. 8 illustrates a device for heating a workpiece according to yet another embodiment.

As shown in FIG. 1, the end 110 of the thermal shield 106 adjacent the heating element 104 may lie along a plane perpendicular to the primary direction of heating 103. In a further embodiment, shown in FIG. 8, the end 110 of the thermal shield 106 may be tapered towards the heating element 104. As mentioned above, fins may be added to any of the embodiments of the present invention. In FIG. 8, fins 129 are positioned at an end of the thermal shield 106 located away from the workpiece. However, the fins 129 in this and other embodiments may be positioned along any surface of the thermal shield, preferably located away from the workpiece. Such fins 129 operate on the principles of conduction and convection. For instance, the fins 129 in FIG. 8 carry heat away from the thermal shield 106, and transfer the heat to the ambient air via convection. In essence, the fins increase the surface area of the thermal shield, substantially increasing the convective cooling rate. A typical fin may have a rectangular or wedge-shaped cross section, and is preferably constructed of a material having a high thermal conductivity to quickly carry heat from the thermal shield.

The dimensions of the heating element 104 and thermal shield 106 may vary. Exemplary dimensions of the heating element 104 are between about 0.1 mm and about 10 mm wide (W), and between about 0.1 mm and about 50 mm long (L). Note the dimensional references in FIG. 1. Exemplary dimensions of the thermal shield 106 are between about 0.1 mm and about 5 mm thick as measured outward from the heating element 104. In an illustrative embodiment, the heating element 104 is about 0.25–1 mm wide by about 5–25 mm long. The thermal shield 106 is about 0.5–1 mm thick as measured from the heating element 104 out. Again, all dimensions provided herein are for illustrative purposes only, and actual dimensions may be higher or lower. As general guidance, the dimensions of the heating element 104 may generally be coextensive with or smaller than the surface to be heated so as to avoid the above-mentioned problems associated with heating peripheral areas of the workpiece.

Figure 9:
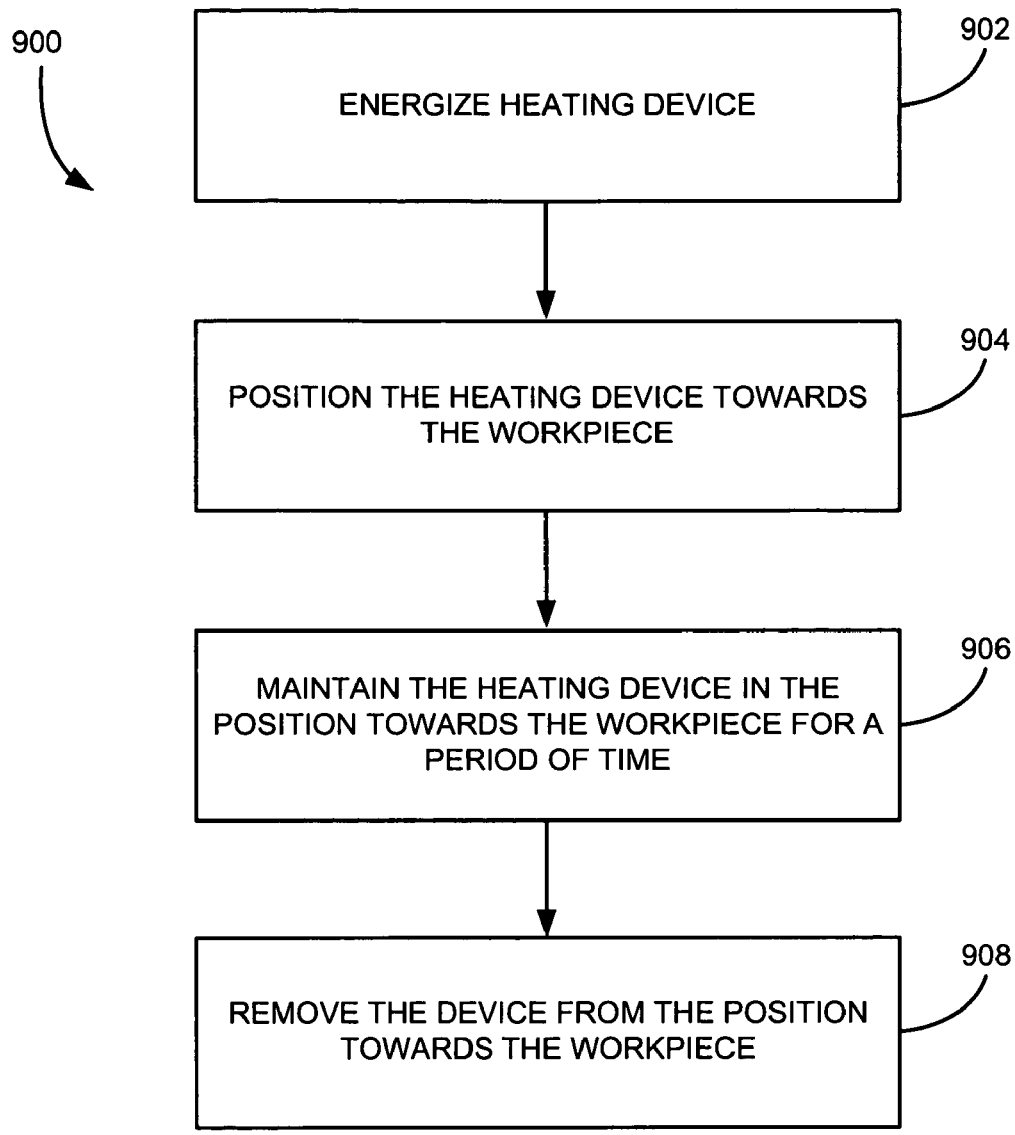
FIG. 9 is a flow diagram of a method for heating a workpiece according to one embodiment.

FIG. 9 graphically depicts a method 900 for heating a workpiece. In operation 902, a heating device is energized e.g., by passing electricity therethrough. In operation 904, the heating device is positioned towards the workpiece, i.e., in contact with or merely near the workpiece. In operation 906, the device is held at the position towards the workpiece for a period of time for heating the workpiece. In operation 908, the device is removed from the position towards the workpiece.

Figure 10A:
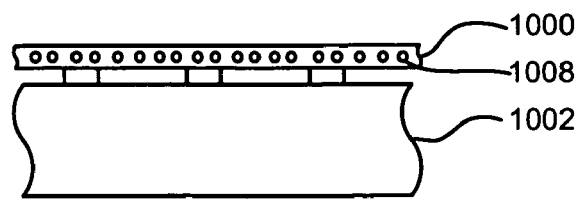
FIGS. 10A–D depict a process for ACF bonding according to one embodiment.
Figure 10B:
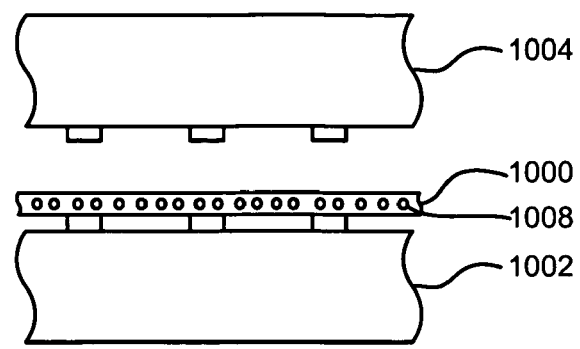
Figure 10C:
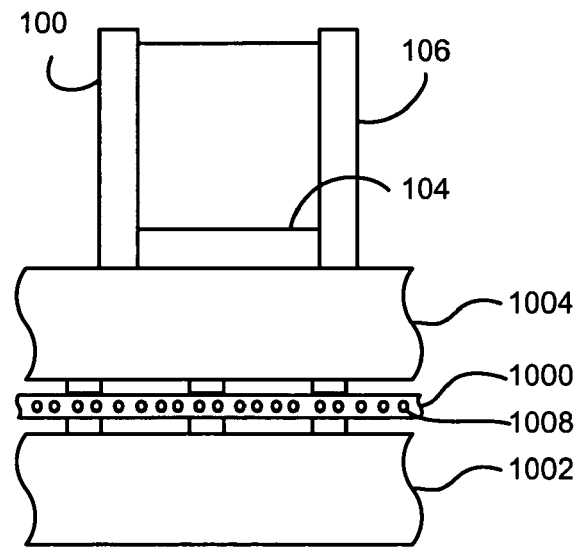
Figure 10D:
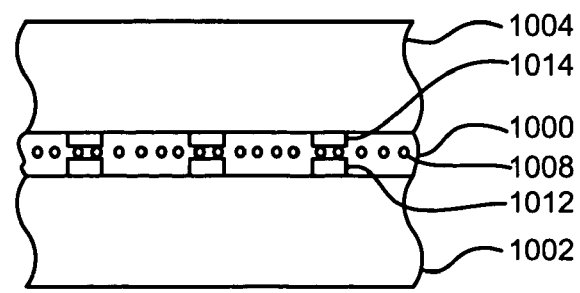

FIGS. 10A–D graphically depict a process for ACF bonding. ACF is a material used for interconnecting and adhering electronic components. As shown in FIG. 10A, an ACF 1000 is positioned on a first substrate 1002. The ACF 1000 includes an insulating adhesive film with dispersed conductive particles 1008. Such particles 1008 may be nickel particles, plastic particles plated with gold, etc. As shown in FIG. 10B, a second substrate 1004 (the workpiece in this example) is positioned over the ACF 1000. Electricity is passed to the heating element 104 until the heating element is at about the desired temperature, e.g., 100–300° C. Then, as shown in FIG. 10C, the heating device 100 is placed on the surface of the second substrate 1004 for an amount of time sufficient to make the ACF 1000 pliable. Meanwhile, pressure is exerted against the second substrate 1004 such that the conductive particles 1008 of the ACF 1000 create electrical connections between contacts 1012 of the second substrate and contacts 1014 of the first substrate, as shown in FIG. 10D. A typical duration for heating and application of pressure may be 10–30 seconds. The thermal shield 106 reduces conduction and radiation of heat from the heating element 104 to areas of the second substrate 1004 not immediately adjacent the heating element 104. In other words, heat is localized to only the area where the bond is taking place. This method allows localizing the high temperatures required for ACF bonding to only the area required.

Another use for the heating devices described herein is for inducing delamination of layers from a workpiece. Methods for delamination generally include heating the workpiece at the site of the material to be delaminated until the material releases from the workpiece and/or becomes removable by mechanical means, e.g., scraping, rubbing, or pulling. The material is then removed from the workpiece. In a practical example, an ACF bond may be decoupled in this way, where the heat reduces the bonding strength of the ACF, allowing removal of parts coupled thereto.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A device for heating a workpiece comprising:
   a heating element which applies heat directly to a workpiece,
   the workpiece not being part of the device; and
   a thermal shield adjacent the heating element for inhibiting heat conduction and radiation from the heating element to the workpiece in directions other than a primary direction of heating,
   wherein the heating element does not extend beyond the thermal shield in the primary direction of heating,
   wherein the thermal shield is a laminate structure comprising laminated layers, one of the laminated layers being sandwiched between another of the laminated layers and the heating element,
   wherein the laminate structure includes first and second layers of material, the first layer of material having a lower thermal conductivity than the second layer of material,
   wherein the first layer is adjacent the heating element, the second layer acting as a heat sink to the first layer.

2. A device as recited in claim 1, wherein the heating element is coextensive with the thermal shield in the primary direction of heating.

3. A device as recited in claim 1, wherein the heating element is recessed slightly from the thermal shield in a direction opposite the primary direction of heating.

4. A device as recited in claim 1, wherein the heating element physically engages the workpiece.

5. A device as recited in claim 1, wherein the heating element is a radiant heating element.

6. A device as recited in claim 1, wherein the first layer is adjacent the heating element, the second layer acting as a heat sink to the workpiece.

7. A device as recited in claim 1, wherein the thermal shield has a generally planar end oriented about perpendicular to the primary direction of heating.

8. A device as recited in claim 1, wherein the thermal shield has an end tapering towards the heating element.

9. A device as recited in claim 1, wherein the heating element is between about 0.1 mm and about 10 mm wide and between about 0.1 mm and about 50 mm long as measured in directions perpendicular to the primary direction of heating.

10. A method for heating a workpiece, comprising
    energizing a device comprising:
    a heating element adapted to apply heat directly to a workpiece, the workpiece not being part of the device; and
    a thermal shield adjacent the heating element for inhibiting lateral heat conduction and radiation from the heating element,
    wherein the heating element does not extend beyond the thermal shield in a direction towards the surface being heated,
    wherein the thermal shield is a laminate structure comprising laminated layers, one of the laminated layers being sandwiched between another of the laminated layers and the heating element,
    wherein the laminate structure includes first and second layers of material, the first layer of material having a lower thermal conductivity than the second layer of material,
    wherein the first layer is adjacent the heating element, the second layer acting as a heat sink to the first layer,
    positioning the device towards the workpiece; and
    heating the workpiece.

11. A method as recited in claim 10, wherein the workpiece becomes coupled to another object at least in part from the heating.

12. A method as recited in claim 11, wherein the heating creates a uniform bonding of an anisotropic conductive film to the workpiece across a contiguous area corresponding to about an area defined by a periphery of the heating element.

13. A method as recited in claim 11, wherein the heating melts a solder.

14. A method as recited in claim 10, wherein the heating at least partially cures a polymer in a vicinity of the heating.

15. A method as recited in claim 10, wherein the heating at least partially delaminates a material from the workpiece.

* * * * *